United States Patent Office 3,557,011
Patented Jan. 19, 1971

3,557,011
$CO_2$ SORPTION MATERIAL
Gerald V. Colombo, Playa del Rey, and Edgar S. Mills, Long Beach, Calif., assignors to McDonnell Douglas Corporation, a corporation of Maryland
No Drawing. Filed July 31, 1967, Ser. No. 657,031
Int. Cl. B01d *41/00,* C09k *3/00*
U.S. Cl. 252—189                                 7 Claims

ABSTRACT OF THE DISCLOSURE

A composition for removing carbon dioxide from gases, comprising magnesium oxide and potassium hydroxide, which is manufactured in a specific pellet form.

BACKGROUND OF THE INVENTION

Whenever people are located in a confined area for an extended length of time, the carbon dioxide content of the air increases. This increase in carbon dioxide causes certain physiological effects upon the persons who breathe such air. The excess carbon dioxide in the air can be removed by either one of two methods. The first method is to continually replace the quantity of air which the persons are breathing. However, this method requires that a large volume of replaceable air be available. In some instances, to use replaceable air is just not feasible, as where the persons are to breathe such air for an extended period of time. The second method is to use some type of apparatus or composition to remove the carbon dioxide from the gaseous air mixture. It is to this second method that the subject matter of this invention is related.

Basically, there are two types of devices to remove carbon dioxide from the gaseous air mixture. The first type of device is known as an adsorber and the second type is known as an absorber. The adsorption apparatus is thought not to employ the use of any chemical reaction between the carbon dioxide and the material of the adsorber. Actually, an adsorber is constructed of a material which has a surface which is attractable to molecules of carbon dioxide. One such material which is commonly used as being attractive to molecules of $CO_2$ is synthetic zeolite. This adsorber is constructed to be porous so as to easily permit the molecules of the carbon dioxide to flow throughout the device, thereby making available the greatest amount of surface area for which the molecules of carbon dioxide can adhere. Usually, such devices are capable of retaining enough carbon dioxide to equal five to ten percent of its own weight. One disadvantage to such a device is that it cannot be used in the presence of moisture, as usually the material of the device has a greater affinity for water than the carbon dioxide. Therefore, it is often necessary to provide a drying apparatus to remove all the moisture from the air before it comes in contact with the adsorption material. However, one advantage to such an adsorber is that it is regenerable. That is, once the device is retaining the maximum amount of carbon dioxide, by the application of heat energy in either a vacuum or inert gas atomsphere, the carbon dioxide molecules can be removed from the device and it can be recycled to again adsorb carbon dioxide.

The absorber type of apparatus is constructed of a composition which chemically reacts with the carbon dioxide and puts such in a nongaseous state. One advantage of the absorber as compared to the adsorber is that the absorber can retain a greater percentage of its own weight in carbon dioxide. Also, most absorbers are compatible with water, thereby negating the use of a drying apparatus. However, one distinct disadvantage is that such devices heretofore are not regenerable, that is, once used, the carbon dioxide cannot be economically removed and the absorber has no further utility. Two types of absorbing materials are defined in U.S. Pats. Nos. 2,270,025 and 2,322,206. Pat. 2,270,025 employs the use of sodium hydroxide and calcium oxide to react with the carbon dioxide forming sodium carbonate and calcium carbonate. Pat. 2,322,206 employs the use of barium hydroxide and calcium oxide. Although both of these types of absorbers have a high rate of absorption ability, both compositions are not capable of economical regeneration.

SUMMARY OF THE INVENTION

The composition of this invention is a pellet-formed compound of magnesium oxide and potassium hydroxide. By experimentation, the amount of potassium hydroxide which gives the maximum absorption efficiency should be about 20% to the weight of the magnesium oxide. The pellets are formed by mixing basic magnesium carbonate (4 $MgCO_3 \cdot Mg(OH)_2 \cdot 5H_2O$) into a given quantity of water in which has been dissolved a given quantity of potassium hydroxide (KOH). This solution is allowed to completely saturate, and then more water is added until a creamy paste is formed. This paste is extruded into ⅛ inch pellets and then dried. The pellets in this form are basically composed of magnesium carbonate ($MgCO_3$) with the potassium hydroxide (KOH) remaining in the mixture as a catalyst. The pellets are then heated to a sufficient temperature to remove $CO_2$ from the magnesium carbonate thereby forming magnesium oxide (MgO). Thereafter, saturated steam is passed through the magnesium oxide pellets until the weight of the pellets is increased approximately 80 to 100%. Now the pellets are ready for use.

It is not known whether the potassium hydroxide is an active ingredient in the composition or acts merely as a catalyst. In any event, it is known that the potassium hydroxide speeds up the rate of reaction and causes the magnesium oxide to absorb the greatest amount of carbon dioxide in the shortest possible time. The addition of the saturated steam to the formed pellet is also for the purpose of increasing the rate of absorption. Further, it appears that the specific method of pellet formation (heating the formed pellet and removing the $CO_2$ from the magnesium carbonate) results in a quite porous pellet structure. This permits easy access by the carbon dioxide to all portions of the pellet.

DETAILED DESCRIPTION OF THE INVENTION

In the forming of any compound for the removal of carbon dioxide, it is known that certain metallic oxides are capable of chemical reaction with gaseous carbon dioxide forming a carbonate. Such metallic oxides are located in Groups IIa and IIb of the Chemical Periodic Table. In the selection of the metallic oxide for this invention, the following criteria was followed:

(1) The metallic oxide should have a relatively high theoretical capacity for the absorption of the greatest amount of mass of carbon dioxide.

(2) Since it is desirable that the carbon dioxide, once it has been absorbed by the metallic oxide, be removed from from the material thereby resulting in reuse of the material, it is desired that the smallest amount of regeneration of energy be required.

(3) That the metallic oxide have non-toxic characteristics in relations to human beings.

It was noted that beryllium oxide has a high theoretical carbon dioxide absorption capacity. However, the high toxicity of beryllium excludes it from use around human beings. The elements of magnesium and then calcium follow in the greatest amount of capacity of absorption of carbon dioxide. It is noted that magnesium has a higher absorption capability than calcium and also requires less energy to regenerate the carbon dioxide once it has been absorbed. Since neither material is toxic, it would appear that magnesium would be the most favorable between the two. However, one difficulty with the use of magnesium has been that its rate of absorption is extremely low while the rate of absorption of calcium is much higher. Therefore, heretofore, calcium has been used in lieu of the more favorable element of magnesium.

One difficulty in the use of calcium has been its regeneration characteristics. Due to the amount of energy required to remove the absorbed carbon dioxide from the calcium and the rate of removal, it has been economically not feasible to regenerate the calcium material. However, it is noted that about 50% less energy is required to remove the carbon dioxide from magnesium material than from the calcium material. Also, the rate of removal is much quicker. Therefore, if it could be possible to increase the rate of absorption of the magnesium element, it would be possible to produce a far superior carbon dioxide absorbing material than has been previously known.

It is to be noted that both silver and zinc were considered as possible absorption materials. Although both silver and zinc would require a small amount of regeneration energy, both materials have a low theoretical absorption capability.

The basic chemical absorbing reaction for the magnesium oxide is:

$$MgO + CO_2 \rightarrow MgCO_3$$

However, this reaction as previously stated takes place at a relatively slow rate, therefore, it was decided that the inclusion of one or more additives to the magnesium oxide be considered which would cause an increase in the rate of reaction. Such additives can either form part of the chemical or may act strictly as a catalyst.

The inclusion of water to the magnesium oxide compound was considered as a possible additive. It was found that if a certain amount of saturated steam was passed through the magnesium oxide, both the rate of absorption of $CO_2$ and the capacity of absorption of the magnesium oxide was substantially increased. However, it is important to note that only an amount of water which can be taken up by the magnesium oxide is added, since the inclusion of additional water only serves to block the pores of the absorbent material and reduce its permeability. It is thought that the chemical reactions are as follows with the inclusion of the water:

$$MgO + H_2O \rightarrow Mg(OH)_2$$

$$CO_2 + H_2O \rightarrow H_2CO_3$$

$$Mg(OH)_2 + H_2CO_3 \rightarrow MgCO_3 \cdot 2H_2O$$

Thus, it appears that the magnesium oxide is converted to a hydroxide which readily combines with the carbonic acid and forms the hydrated carbonate. The overall reaction remains the same as the original magnesium oxide reaction except that the moisture is present in the reactants and the products.

Since the rate of reaction was still not sufficient to make the magnesium oxide a $CO_2$ absorption material, the inclusion of a further additive was considered. It was thought that possibly a phosphate might improve structural properties of the magnesium oxide. When a small amount of potassium phosphate ($KH_2PO_4$) was added to the magnesium oxide the structure of the compound was not increased but the absorption rate and the capacity were significantly improved. When sodium phosphate ($Na_3PO_4$) was employed instead of the potassium phosphate, the absorption rate and the capacity was improved even to a greater extent. This led to the conclusion that it was the alkali metal cations ($K^+$ and $Na^+$) that were responsible for this improvement. It was determined that in the presence of water, the ions in the form of hydroxides were raising the pH of the mixture and thus improving the affinity for carbon dioxide. Tests were sodium and potassium hydroxide confirmed this determination with potassium being the most effective on a molar and weight basis. When considering Group Ia of the periodic table, and looking upon water as hydrogen hydroxide, the activity of the hydroxide of these elements apparently increases as one progresses down the group. Thus water was found to increase the activity of magnesium hydroxide, the activity of sodium hydroxide somewhat more, and the activity of potassium hydroxide even more. This correlation suggested that rubidium and cesium hydroxides should be even more effective. However, this did not prove to be the case and potassium hydroxide remains the most effective additive found to date.

It was also determined that with the presence of water in the composition that the ions in the form of the hydroxides were raising the pH of the mixture and thus improving its affinity for the carbon dioxide. The subsequent experiments with the sodium and potassium hydroxide confirmed this theory, with the potassium hydroxide being the most effective of the two. It was found that the amount of potassium hydroxide which gave maximum efficiency in carbon dioxide absorption was 20% by weight with respect to the magnesium oxide. With the inclusion of the potassium hydroxide as an additive, the capacity for absorption of the magnesium oxide was increased by a factor approaching 2, and the absorption rate was increased by a factor greater than 10. As a result, a carbon dioxide absorbing composition was achieved which is far superior to any previously known regenerable composition in both quantity of carbon dioxide absorbed and the rate of absorption.

Having now determined the formulation for the composition to be used, the structural form of the composition must now be determined. Basically, for the form of the material to be useful, the material must be readily transportable and placeable in the confined areas of air-conditioning systems. The form must be such that it is relatively porous so that the $CO_2$ is capable of coming into contact with the greatest amount of surface area of the absorbing composition. It was decided that the basic form to be most usable would be a pellet form. The pellets are formed in the following manner so that they are readily porous.

An amount of commercially available magnesium carbonate with the formula of $4 MgCO_3 \cdot Mg(OH)_2 \cdot 5H_2O$ is added to sufficient water to form an aqueous slurry. In water has been dissolved the additive such as potassium hydroxide the amount of such being sufficient to give 20% by weight of the potassium hydroxide to the resulting magnesium oxide. This slurry is allowed to saturate for a period of ½ to 1 hour. At this time, more water is added until finally a creamy paste is achieved. This paste is then extruded into ⅛ inch pellets and then dried. At this time these pellets are mainly formed of magnesium carbonate ($MgCO_3$). The pellets are then heated at a sufficient temperature to cause the removal of the $CO_2$ from the magnesium carbonate resulting in magnesium oxide ($MgO$). It is important that this temperature be not so high as to cause sintering which is conglomerating of the pellet material without melting. A temperature of 500° C. has been found to be sufficient. The formulation for application of heat is:

$$MgCO_3 \rightarrow MgO + CO_2 \uparrow$$

Logically, as the $CO_2$ is removed from the magnesium carbonate, spaces or gaps are left within the structure which makes the structure relatively porous and easily accessible by the gas containing $CO_2$. The pellets are now exposed to saturated steam until the weight of the pellets increase 80 to 100%. The pellets at this time are now ready for $CO_2$ absorption.

It appears that the particular pellet construction causes the composition to act not only as an absorber but as an adsorber. In other words initially the $CO_2$ chemically reacts with the magnesium oxide composition until the maximum amount of magnesium carbonate is formed. Then, at this time, an additional small percentage of carbon dioxide clings to the surface of the magnesium carbonate thereby effecting further removal of carbon dioxide. This adsorbing characteristic becomes evident upon noting the regeneration characteristics of the composition. Basically, regeneration is accomplished by the application of sufficient heat energy to cause the emission of the carbon dioxide from the magnesium carbonate, resulting in the transformation of the composition back to magnesium oxide. Any temperature which is sufficient to cause the removal of the carbon dioxide would be adequate, it only being necessary that the temperature be not so high as to cause the pellets to sinter. It is desirable to regenerate the pellets in the shortest possible time, yet also do minimum amount of damage to the pellet construction so that the pellets may be regenerated a maximum number of times.

Two suggested methods of regeneration will now be described. However, it is to be noted that this invention is not to be restricted to these two particular methods, it only being that these methods have been found to be satisfactory. Also, it is contemplated that other regeneration methods could be found to be as satisfactory or even more satisfactory to some degree. The first method of regeneration is to directly bring the regeneration temperature up to 400° within about 10 minutes from the time the pellets have been confined within the oven. This temperature 400° is maintained for a period of 70 additional minutes. It has been found that the pellets will reach a first peak of $CO_2$ emission rate within the first eight minutes. This first peak appears to be the emission of the $CO_2$ which has been clinging to the surface of the magnesium carbonate. A second peak of $CO_2$ emission is reached in about 30 minutes. For the next 50 minutes, the rate of emission of the $CO_2$ rapidly declines and upon a total time of 70 to 75 minutes the rate of $CO_2$ emission is very close to zero. However, it is to be understood that the times presented here are merely representative. The time element will vary by the size and geometry of the mass to be regenerated.

The second method of regeneration is to bring the temperature up to a maximum in increments with the maximum temperature not exceeding 275° C. The first increment is to bring the temperature quickly to 125° and hold such for a period of about 60 minutes, then the temperature is increased to 175° and held there an additional 15 to 20 minutes. The third increment is to increase the temperature to 225° and hold it there for about 30 minutes. The final increment is to bring the temperature to the 275° and hold it at that point for an additional 190 minutes. With this type of regeneration process the $CO_2$ is emitted more slowly. There is an initial peak in about 20 minutes, then the rate of emission declines until a total time of about 100 minutes is achieved. At this time the rate of emission rapidly increases with a peak at about a total time of 125 minutes. Thereafter, the rate of $CO_2$ emission rapidly declines and becomes near zero at about a total time of 300 minutes. In each of these methods of regeneration, it has been found to be advantageous to also steam purge the pellets during regeneration. The minute droplets of water in the steam help to remove the carbon dioxide from the pellet structure.

Clearly, with the first method of regeneration a much shorter time is required to regenerate the composition. However, in instances where conservation of energy would be necessary, the second mode of regeneration would be used. After about twelve regenerations the pellets crumble into a powder form losing the porous pellet nature necessary to absorb the maximum amount of $CO_2$. It also appears that the 400° C. method of regeneration is superior to the 275° C. method in that usually one or two more regeneration of the pellets is achieved. Also, the 400° C. method places the pellets at the maximum capacity for carbon dioxide absorption.

While this invention has been described in connection with providing a composition suitable for breathing apparatus, it is recognized that other uses can be made of the composition. For example, it is contemplated that any acid gas could be removed by the composition of this invention such as sulphur dioxide, phosgene, etc. It is intended that no inference be drawn from the detailed description given in disclosing a composition and a preferred method of manufacture, which tend to narrow the scope of the invention beyond that as defined by the claims.

We claim:
1. A regenerable composition capable of removing carbon dioxide from a gaseous mixture, consisting essentially of a mixture of about 80% by weight magnesium oxide and about 20% by weight alkali metal hydroxide, said alkali metal hydroxide being evenly interspersed with the magnesium oxide to increase the sorption capacity and sorption rate of said magnesium oxide.

2. The regenerable composition as defined in claim 1 wherein said alkali metal hydroxide is selected from the group consisting of sodium hydroxide, potassium hydroxide, rubidium hydroxide and cesium hydroxide.

3. The regenerable composition as defined in claim 1 wherein said alkali metal hydroxide is potassium hydroxide.

4. The regenerable composition as defined in claim 1, which includes an amount of water which can be taken up by the magnesium oxide.

5. A method of manufacture of a carbon dioxide sorbent comprising the steps of saturating with water a mixture of magnesium carbonate and an alkali metal hydroxide, forming a creamy paste of said mixture, extruding said mixture into small pellets, drying said pellets, heating said pellets at a sufficient temperature to remove the carbon dioxide from the magnesium carbonate resulting in the forming of a mixture of about 80% by weight of magnesium oxide and about 20% by weight of alkali metal hydroxide, and passing saturated steam through said pellets until the weight thereof is increased about 80 to 100%.

6. The method of manufacture defined in claim 5 wherein said alkali metal hydroxide is selected from the group consisting of sodium hydroxide, potassium hydroxide, rubidium hydroxide and cesium hydroxide.

7. The method of manufacture defined in claim 5 wherein said alkali metal hydroxide is potassium hydroxide.

References Cited

UNITED STATES PATENTS

| | | | |
|---|---|---|---|
| 1,821,195 | 9/1931 | Woodhouse | 252—189X |
| 2,144,740 | 1/1939 | Pollak | 252—189 |
| 2,395,842 | 3/1946 | Borgstrom | 252—192X |

RICHARD D. LOVERING, Primary Examiner

I. GLUCK, Assistant Examiner

U.S. Cl. X.R.

23—2; 55—522; 252—92